United States Patent
Kawai

(10) Patent No.: US 11,228,054 B2
(45) Date of Patent: Jan. 18, 2022

(54) LITHIUM ION SECONDARY BATTERY

(71) Applicant: Murata Manufacturing Co., Ltd., Nagaokakyo (JP)

(72) Inventor: Toru Kawai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 199 days.

(21) Appl. No.: 16/743,382

(22) Filed: Jan. 15, 2020

(65) Prior Publication Data

US 2020/0153034 A1    May 14, 2020

Related U.S. Application Data

(63) Continuation of application No. PCT/JP2018/027153, filed on Jul. 19, 2018.

(30) Foreign Application Priority Data

Jul. 25, 2017 (JP) .............................. JP2017-143514

(51) Int. Cl.
*H01M 4/131* (2010.01)
*H01M 10/0525* (2010.01)
*H01M 4/02* (2006.01)

(52) U.S. Cl.
CPC ....... *H01M 10/0525* (2013.01); *H01M 4/131* (2013.01); *H01M 2004/027* (2013.01);
(Continued)

(58) Field of Classification Search
None
See application file for complete search history.

(56) References Cited

U.S. PATENT DOCUMENTS 9,711,791 B2    7/2017 Yamamoto et al.
10,283,769 B2    5/2019 Yamamoto et al.
(Continued)

FOREIGN PATENT DOCUMENTS

JP    2006236994 A    9/2006
JP    2008053206 A    3/2008
(Continued)

OTHER PUBLICATIONS

International Search Report issued for PCT/JP2018/027153, dated Oct. 23, 2018.
(Continued)

*Primary Examiner* — Wyatt P McConnell
(74) *Attorney, Agent, or Firm* — Arent Fox LLP

(57) ABSTRACT

A lithium ion secondary battery that includes a laminated electrode assembly in which a positive electrode having a positive electrode active material layer, a negative electrode having a negative electrode active material layer, and a separator interposed between the positive electrode and the negative electrode are alternately planarly laminated. The laminated lithium ion secondary battery has an end-of-charge voltage of 4.41 V to 4.47V, a ratio of the entire area of the negative electrode active material layer to an area of facing portions of the positive electrode active material layer and the negative electrode active material layer of 100.5% to 104.0%, a gap between the positive electrode and the negative electrode of 0.1 mm to 0.5 mm, and a discharge capacity per unit weight of a positive electrode active material in the positive electrode active material layer of 169.0 mAh/g to 178.0 mAh/g.

19 Claims, 2 Drawing Sheets

(52) U.S. Cl.
CPC .. *H01M 2004/028* (2013.01); *H01M 2220/20* (2013.01); *H01M 2220/30* (2013.01)

(56) References Cited

U.S. PATENT DOCUMENTS

| | | |
|---|---|---|
| 2006/0068293 A1 | 3/2006 | Kim et al. |
| 2006/0172185 A1 | 8/2006 | Mimura |
| 2013/0280594 A1 | 10/2013 | Kajita et al. |
| 2015/0104699 A1 | 4/2015 | Nakagawa |
| 2015/0155555 A1 | 6/2015 | Yamamoto et al. |
| 2017/0110724 A1 | 4/2017 | Sakamoto et al. |
| 2017/0279119 A1 | 9/2017 | Yamamoto et al. |
| 2018/0034053 A1 | 2/2018 | Takaoka et al. |

FOREIGN PATENT DOCUMENTS

| | | |
|---|---|---|
| JP | 2012023052 A | 2/2012 |
| JP | 201493271 A | 5/2014 |
| JP | 2015056241 A | 3/2015 |
| JP | 201576389 A | 4/2015 |
| JP | 2015072805 A | 4/2015 |
| WO | 2014021014 A1 | 2/2014 |
| WO | 2015151375 A1 | 10/2015 |
| WO | 2016129527 A1 | 8/2016 |

OTHER PUBLICATIONS

Written Opinion of the International Searching Authority issued for PCT/JP2018/027153, dated Oct. 23, 2018.
International Search Report issued for PCT/JP2018/027154, dated Oct. 23, 2018.
Written Opinion of the International Searching Authority issued for PCT/JP2018/027154, dated Oct. 23, 2018.

LITHIUM ION SECONDARY BATTERY

CROSS REFERENCE TO RELATED APPLICATIONS

The present application is a continuation of International application No. PCT/JP2018/027153, filed Jul. 19, 2018, which claims priority to Japanese Patent Application No. 2017-143514, filed Jul. 25, 2017, the entire contents of each of which are incorporated herein by reference.

FIELD OF THE INVENTION

The present invention relates to a lithium ion secondary battery.

BACKGROUND OF THE INVENTION

Conventionally, a secondary battery has been used as a power source for various electronic devices. The secondary battery has a structure in which a positive electrode, a negative electrode, a separator disposed between the positive electrode and the negative electrode, and an electrolyte are enclosed in an exterior body. In particular, in a lithium ion secondary battery, lithium ions move between the positive electrode and the negative electrode through the electrolyte, so that the battery is charged and discharged.

In recent years, a lithium ion secondary battery with a high end-of-charge voltage has been proposed due to the demand for higher energy density of the lithium ion secondary battery (for example, see Patent Document 1). Further, a technique using a solvent having good ion conductivity in a nonaqueous electrolyte has been proposed (for example, see Patent Documents 2 and 3).

Patent Document 1: Japanese Patent Application Laid-Open No. 2012-23052
Patent Document 2: Japanese Patent Application Laid-Open No. 2015-72805
Patent Document 3: Japanese Patent Application Laid-Open No. 2015-56241

SUMMARY OF THE INVENTION

The inventors of the present invention have found that a new problem occurs in a conventional lithium ion secondary battery that, when the end-of-charge voltage is increased to 4.41 V or more, deterioration of a battery material is promoted due to higher voltage, and cycle characteristics are deteriorated. If the cycle characteristics are deteriorated in a lithium ion secondary battery, the discharge capacity is lowered due to repeated charge and discharge, and the ratio (capacity maintenance ratio) of the cell capacity after a cycle to the initial cell capacity is lowered. Accordingly, the life of the battery is shortened.

An object of the present invention is to provide a lithium ion secondary battery in which more excellent cycle characteristics can be obtained even when the end-of-charge voltage is increased to 4.41 V or more.

The present invention relates to a laminated lithium ion secondary battery including a laminated electrode assembly in which a positive electrode having a positive electrode active material layer, a negative electrode having a negative electrode active material layer, and a separator interposed between the positive electrode and the negative electrode are alternately planarly laminated, the laminated lithium ion secondary battery having an end-of-charge voltage at 4.41 V to 4.47V.

A ratio of the entire area of the negative electrode active material layer to an area of facing portions of the positive electrode active material layer and the negative electrode active material layer is 100.5% to 104.0%, a gap between the positive electrode and the negative electrode is 0.1 mm to 0.5 mm, and a discharge capacity per unit weight of a positive electrode active material in the positive electrode active material layer is 169.0 mAh/g to 178.0 mAh/g.

A lithium ion secondary battery of the present invention exhibits more excellent cycle characteristics even when the end-of-charge voltage is increased to 4.41 V or more.

DETAILED DESCRIPTION OF THE INVENTION

[Lithium Ion Secondary Battery]

The present invention provides a lithium ion secondary battery. In the present description, the term "lithium ion secondary battery" refers to a battery that can be repeatedly charged and discharged by the transfer of electrons by lithium ions. Therefore, the "lithium ion secondary battery" is not excessively bound by the name, and may include, for example, a "lithium ion storage device" and the like.

The lithium ion secondary battery (hereinafter sometimes simply referred to as the "secondary battery") of the present invention has an end-of-charge voltage of 4.41 V or more, or, from the viewpoint of increased energy density due to higher voltage of the secondary battery, preferably 4.43 V or more, or more preferably 4.45 V or more. From the viewpoint of a balance between increased energy density due to higher voltage of the secondary battery and further improvement in cycle characteristics, a preferable end-of-charge voltage is 4.41 V to 4.47 V, more preferably 4.43 V to 4.47 V, further preferably 4.45 V to 4.47 V, or most preferably 4.46 V to 4.47 V. The end-of-charge voltage is a final voltage at the time of charging that is determined at the time of designing of the secondary battery, is also referred to as a "charge upper limit voltage," and is one of the specifications of the secondary battery.

In the present specification, the cycle characteristics are characteristics in which lowering in discharge capacity caused by repeated charge and discharge is more sufficiently suppressed. "After a cycle" means "after repeated charge and discharge."

The secondary battery of the present invention includes a positive electrode, a negative electrode, and a separator disposed between the positive electrode and the negative electrode, and usually further includes a nonaqueous electrolyte. The secondary battery of the present invention is usually configured by enclosing an electrode assembly composed of a positive electrode, a negative electrode, and a separator, and a nonaqueous electrolyte in an exterior body.

Figure 1:
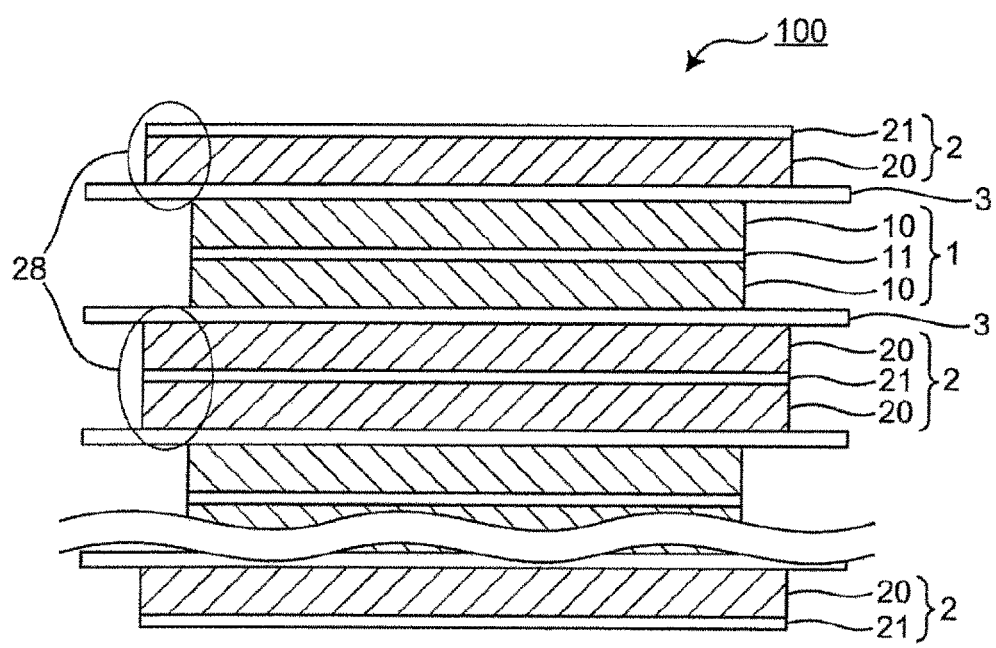
FIG. 1 is a schematic cross-sectional view showing an example of an electrode assembly having a planar laminated structure.

In an electrode assembly 100, as shown in FIG. 1, positive electrodes 1 and negative electrodes 2 are alternately laminated planarly with separators 3 interposed between them. Specifically, the electrode assembly 100 has a planar laminated structure in which a plurality of electrode units (electrode constituent layers) including the positive electrode 1, the negative electrode 2, and the separator 3 disposed between the positive electrode and the negative electrode are laminated planarly, that is, a laminated structure. When the electrode assembly has such a planar laminated structure, a lithium ion secondary battery including the electrode assembly is referred to as a "laminated lithium ion secondary battery" or a "planar laminated lithium ion secondary battery." FIG. 1 is a schematic cross-sectional view showing an example of an electrode assembly having the planar laminated structure.

In the present invention, for a positive electrode active material layer 10 that the positive electrode 1 has and a negative electrode active material layer 20 that the negative electrode 2 has a "ratio of an entire area of the negative electrode active material layer to an area of facing portions of the positive electrode active material layer and the negative electrode active material layer of 100.5% to 104.0%, or, from the viewpoint of further improving the cycle characteristics, preferably 100.5% to 103.5%, more preferably 100.5% to 103.0%, or further preferably 100.5% to 102.0%. As described above, the negative electrode active material layer has reasonably larger dimensions than the positive electrode active material layer, so that the battery reaction can be reversibly and continuously performed with sufficiently high efficiency even under an environment of a relatively high end-of-charge voltage, and, as a result, the cycle characteristics are improved. If the ratio of the entire area of the negative electrode active material layer is too small, Li is likely to precipitate from an edge portion of the negative electrode active material layer, and an amount of Li ions that move reversibly decreases, resulting in poor cycle characteristics. If the ratio of the entire area of the negative electrode active material layer is too large, the potential of the edge portion of the positive electrode active material layer increases due to the influence of a portion of the negative electrode active material layer not facing the positive electrode active material layer, and the positive electrode active material deteriorates. For this reason, the battery reaction is less likely to occur reversibly and the cycle characteristics deteriorate.

The "ratio of an entire area of the negative electrode active material layer to an area of facing portions of the positive electrode active material layer and the negative electrode active material layer" described above only needs to be achieved between at least one set of the positive electrode active material layer 10 and the negative electrode active material layer 20 that face each other with the separator interposed between them. The "ratio of the entire area of the negative electrode active material layer" is preferably achieved between half or more of all the sets of the positive electrode active material layers and the negative electrode active material layers facing each other with the separator interposed between them from the viewpoint of further improving the cycle characteristics. The "ratio of the entire area of the negative electrode active material layer" is more preferably achieved between all sets of the positive electrode active material layers and the negative electrode active material layers facing each other with the separator interposed between them from the viewpoint of further improving the cycle characteristics.

For the positive electrode active material layer and negative electrode active material layer facing each other, the dimensions of the negative electrode active material layer are usually larger than the dimensions of the positive electrode active material layer. For example, in a case where both the negative electrode active material layer and the positive electrode active material layer have a rectangular shape in a plan view thereof, the dimensions of the negative electrode active material layer are larger than the dimensions of the positive electrode active material layer in both the vertical dimension and the horizontal dimension.

Furthermore, the positive electrode active material layer and the negative electrode active material layer facing each other are usually disposed so that the center of gravity of the negative electrode active material layer and the center of gravity of the positive electrode active material layer overlap in the plan view. The center of gravity is a point when a homogeneous material (for example, paper) is cut out by the outline of the shape of the layer in the plan view, and balanced and supported at the point. The overlap between the center of gravity of the negative electrode active material layer and the center of gravity of the positive electrode active material layer includes not only an overlap that does not strictly include any shift, but also an overlap that has a shift of ±0.5 mm from each other. The plan view is a plan view when an object is viewed from a thickness direction (lamination direction) of the object.

Figure 2:
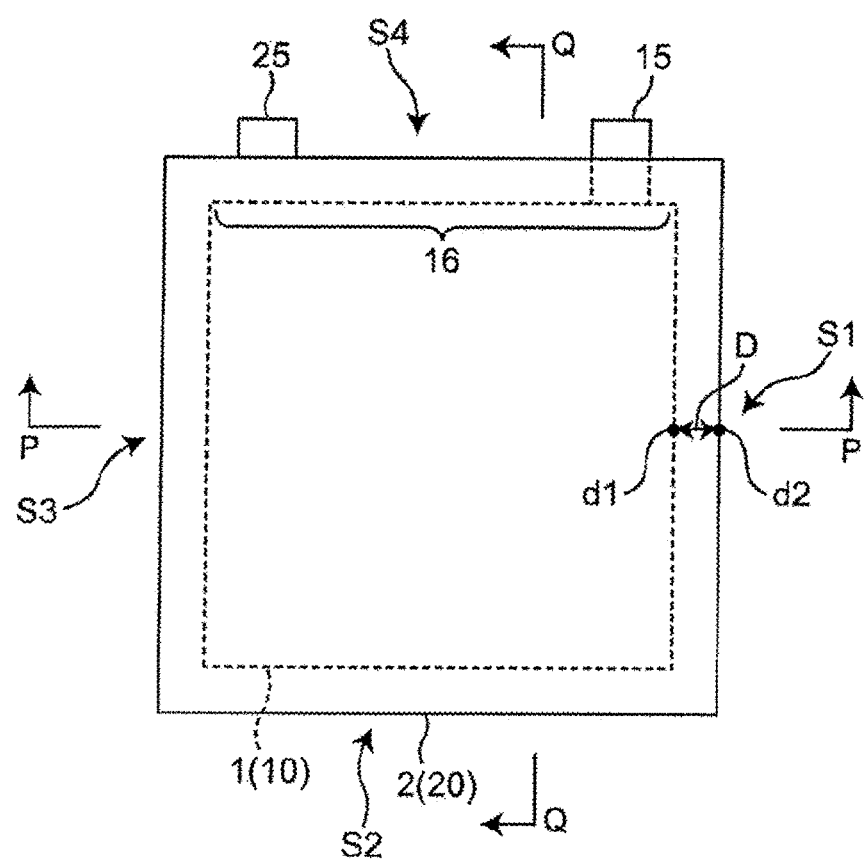
FIG. 2 is a schematic diagram for explaining a gap between a positive electrode and a negative electrode in a lithium ion secondary battery of the present invention.

Therefore, when an optional pair of the positive electrode active material layer and the negative electrode active material layer facing each other in the secondary battery are taken out and viewed from the negative electrode active material layer side, the positive electrode active material layer 1 is hidden by the negative electrode active material layer 2 and not visible as shown in FIG. 2. On the other hand, when viewed from the positive electrode active material layer side, the negative electrode active material layer is visible in four outer edges of the positive electrode active material layer. Note that, in FIG. 2, the separator is omitted.

The "area of facing portions of the positive electrode active material layer and the negative electrode active material layer" is an area of a region where the positive electrode active material layer and the negative electrode active material layer overlap when the layers are viewed in a plan view. As described above, the dimensions of the negative electrode active material layer are larger than the dimensions of the positive electrode active material layer, and the positive electrode active material layer and the negative electrode active material layer facing each other are usually disposed so that their centers of gravity overlap. Accordingly, the "area of facing portions of the positive electrode active material layer and the negative electrode active material layer" is usually an area occupied by the positive electrode active material layer in the plan view.

The "entire area of the negative electrode active material layer" is an area occupied by the negative electrode active material layer in the plan view. The "ratio of the entire area of the negative electrode active material layer" is a ratio of the area occupied by the negative electrode active material layer in the plan view to the "area of facing portions of the positive electrode active material layer and the negative electrode active material layer" described above.

In the present invention, the gap between the positive electrode and the negative electrode is 0.1 mm to 0.5 mm, or, from the viewpoint of further improving the cycle characteristics, preferably 0.1 mm to 0.4 mm, more preferably 0.1 mm to 0.3 mm, or further preferably 0.1 mm to 0.25 mm. As described above, the positive electrode and the negative electrode have a gap of appropriate size, so that the battery reaction can be reversibly and continuously performed with sufficiently high efficiency even under an environment of a relatively high end-of-charge voltage, and, as a result, the cycle characteristics are improved. If the gap is too small, Li is likely to precipitate from an edge portion of the negative electrode active material layer, and an amount of Li ions that move reversibly decreases, resulting in poor cycle characteristics. If the gap is too large, the potential of the edge portion of the positive electrode active material layer increases due to the influence of a portion of the negative electrode active material layer not facing the positive electrode active material layer, and the positive electrode active material deteriorates. For this reason, the battery reaction is less likely to occur reversibly and the cycle characteristics deteriorate.

The gap between the positive electrode and the negative electrode is a gap between the positive electrode active material layer and the negative electrode active material layer facing each other with the separator interposed between them. In view of the fact that the dimensions of the negative electrode active material layer are larger than the dimensions of the positive electrode active material layer as described above, an end portion of the negative electrode active material layer 20 protrudes from an end surface of the positive electrode active material layer 10 in the inside of the secondary battery in the plan view as shown in FIG. 2. As described above, for the positive electrode active material layer 10 and the negative electrode active material layer 20 that face each other with the separator interposed between them in the inside of the secondary battery, a protruding length D of the negative electrode active material layer 20 from the positive electrode active material layer 10 is referred to as a "gap between the positive electrode and the negative electrode." Specifically, the gap between the positive electrode and the negative electrode has a distance between an optional point d1 on a side other than a side 16 having a tab 15 among sides constituting an outer edge of the positive electrode active material layer 10 in the positive electrode 1, and a point d2 that is a point on a side constituting an outer edge of the negative electrode 2 and at a minimum distance from the point d1 in the plan view. More specifically, the gap between the positive electrode and the negative electrode is a gap between the positive electrode and the negative electrode on the side of a side surface having no tab in the secondary battery. For example, in a case where the positive electrode (particularly the positive electrode active material layer) and the negative electrode (particularly the negative electrode active material layer) have a rectangular shape in the plan view, the gap between the positive electrode and the negative electrode is a gap between the positive electrode and the negative electrode on the side of side surfaces S1 to S3 other than the side of a side surface S4 having a tab in the secondary battery as shown in FIG. 2.

More specifically, the gap between the positive electrode and the negative electrode has an average value of optional 10 gaps on the side of the side surfaces S1 to S3 other than the side of the side surface S4 having a tab of the secondary battery in a cross section parallel to and perpendicular to the side 16 having the tab 15 of the uppermost positive electrode active material layer 10 in the plan view. A cross section parallel to the side 16 having the tab 15 is, for example, a P-P cross section in FIG. 2. A cross section perpendicular to the side 16 having the tab 15 is, for example, a Q-Q cross section in FIG. 2. These cross sections can be obtained as X-ray CT images. These cross sections can also be obtained by hardening the electrode assembly that constitutes the secondary battery with resin, and polishing the electrode assembly. A protruding portion 28 of the negative electrode active material layer 20 that defines the protruding length D has a planar (flat plate) shape in FIG. 1. When the protruding portion 28 is curved in a vertical direction in FIG. 1 at the time the protruding length D is measured, the protruding length D is a length when the protruding portion 28 is assumed to be a flat surface (flat plate). Note that the gap between the positive electrode and the negative electrode can be measured by taking an X-ray CT image with ScanXmate (manufactured by Comscantecno Co., Ltd.).

In the present invention, the discharge capacity per unit weight of the positive electrode active material contained in the positive electrode active material layer (hereinafter sometimes referred to as the discharge capacity A) is 169.0 mAh/g to 178.0 mAh/g, or, from the viewpoint of further improving the cycle characteristics, preferably 169.0 mAh/g to 175.0 mAh/g, more preferably 169.0 mAh/g to 172.5 mAh/g. The discharge capacity A is within the above range, so that the battery reaction can be reversibly and continuously performed with sufficiently high efficiency even under an environment of a relatively high end-of-charge voltage, and, as a result, the cycle characteristics are improved. When the discharge capacity A is too high, the potential of the positive electrode is excessively increased and the positive electrode active material is deteriorated. For this reason, the battery reaction is less likely to occur reversibly and the cycle characteristics are deteriorated.

The discharge capacity A is a value calculated by dividing an "initial cell capacity (mAh)" by a weight (g) of the positive electrode active material contained in facing portions of the positive electrode (particularly the positive electrode active material layer) and the negative electrode (particularly the negative electrode active material layer) of the secondary battery.

The "Initial cell capacity (mAh)" is discharge capacity of the stabilized secondary battery, and is discharge capacity measured by a method described below. When the secondary battery is repeatedly charged and discharged, and a capacity change rate $[\{(P_n-P_{n+1})/P_{n+1}\}\times100(\%)]$ between discharge capacity $P_n$ (mAh) due to the n-th charge and discharge and discharge capacity $P_{n+1}$ (mAh) due to the (n+1)-th charge and discharge becomes 0.2% or less for the first time, the discharge capacity $P_{n+1}$ (mAh) is the "initial cell capacity (mAh)." The integer n is one or more.

When charging and discharging are repeated by using the secondary battery, the capacity change rate $[\{(P_n-P_{n+1})/P_{n+1}\}\times100(\%)]$ between discharge capacity $P_n$ (mAh) due to the n-th charge and discharge and discharge capacity $P_{n+1}$ (mAh) due to the (n+1)-th charge and discharge generally becomes smaller as the value of n becomes larger. Therefore, for example, when charging and discharging are repeated using a commercially available secondary battery, the capacity change rate $[\{(P_1-P_2)/P_2\}\times100(\%)]$ exceeds 0.2%, and the capacity change rate $[\{(P_2-P_3)/P_3\}\times100(\%)]$ is 0.2% or less, the discharge capacity $P_3$ is the initial cell capacity of the secondary battery.

The weight (g) of the positive electrode active material contained in the facing portions of the positive electrode (particularly the positive electrode active material layer) and the negative electrode (particularly the negative electrode active material layer) of the secondary battery is a value that may be calculated from an area (cm$^2$) of the facing portions of the positive electrode (particularly the positive electrode active material layer) and the negative electrode (particularly the negative electrode active material layer), the basis weight per unit area (mg/cm$^2$) of the positive electrode active material layer, and a ratio of the positive electrode active material contained in the positive electrode active material layer.

In a case where the secondary battery has two or more sets of the positive electrode active material layer and the negative electrode active material layer facing each other with the separator interposed between them, the weight (g) of the positive electrode active material contained in the facing portions of the positive electrode (particularly the positive electrode active material layer) and the negative electrode (particularly the negative electrode active material layer) of the secondary battery is a total amount of the weight (g) of the positive electrode active material contained in the facing portions of the positive electrode (particularly the positive electrode active material layer) and the negative electrode (particularly the negative electrode active material layer) of each set.

The discharge capacity A can be controlled by adjusting a ratio of the basis weight of the positive electrode active material layer of the positive electrode to the basis weight of the negative electrode active material layer of the negative electrode, an end-of-charge voltage of the lithium ion secondary battery, a kind of the positive electrode active material, a kind of the negative electrode active material, and initial efficiency of the negative electrode active material.

For example, when the ratio of the basis weight of the positive electrode active material layer of the positive electrode to the basis weight of the negative electrode active material layer of the negative electrode is increased, the discharge capacity A increases. When the ratio is decreased, the discharge capacity A decreases.

Further, for example, when the end-of-charge voltage of the lithium ion secondary battery is increased, the discharge capacity A increases. When the end-of-charge voltage is lowered, the discharge capacity A decreases.

Further, for example, since the reversible capacity of each active material varies depending on the kind of the positive electrode active material and the negative electrode active material, the discharge capacity A can be controlled.

Further, for example, in a case where a negative electrode active material with high initial efficiency is used, the discharge capacity A increases. In a case where a negative electrode active material with low initial efficiency is used, the discharge capacity A is lowered.

The basis weight of the negative electrode active material layer of the negative electrode is a deposition amount (after drying) per unit area of the negative electrode active material layer on one surface of the negative electrode. The basis weight of the negative electrode active material layer of the negative electrode is usually 5 mg/cm$^2$ to 15 mg/cm$^2$, or, from the viewpoint of controlling the discharge capacity of the positive electrode active material, preferably 9 mg/cm$^2$ to 12 mg/cm$^2$, or more preferably 9 mg/cm$^2$ to 11 mg/cm$^2$.

The basis weight of the positive electrode active material layer of the positive electrode is a deposition amount (after drying) per unit area of the positive electrode active material layer on one surface of the positive electrode. The basis weight of the positive electrode active material layer of the positive electrode is usually 10 mg/cm$^2$ to 30 mg/cm$^2$, or, from the viewpoint of controlling the discharge capacity of the positive electrode active material, preferably 18 mg/cm$^2$ to 24 mg/cm$^2$.

(Positive Electrode)

The positive electrode 1 has at least the positive electrode active material layer 10. The positive electrode 1 is usually composed of the positive electrode active material layer 10 and a positive electrode current collector (foil) 11, and the positive electrode active material layer 10 is provided on at least one surface of the positive electrode current collector 11. For example, in the positive electrode, the positive electrode active material layer may be provided on both surfaces of the positive electrode current collector, or the positive electrode active material layer may be provided only on one surface of the positive electrode current collector. In the positive electrode that is preferable from the viewpoint of further increasing the capacity of the secondary battery, the positive electrode active material layer is provided on both surfaces of the positive electrode current collector. A secondary battery usually includes a plurality of positive electrodes, and may include one or more positive electrodes having a positive electrode active material layer provided on both surfaces of the positive electrode current collector, and one or more positive electrodes having a positive electrode active material layer provided on one surface of the positive electrode current collector. The positive electrode usually has a positive electrode active material layer on an entire positive electrode active material layer forming surface. For example, in a case where the positive electrode has a rectangular shape, the positive electrode may have a configuration in which, in the positive electrode active material layer forming surface of the positive electrode current collector of the positive electrode, only a tab portion is a non-formation region (uncoated region) of the positive electrode active material layer, and the other portions are a formation region of the positive electrode active material layer. In a similar case, the positive electrode may have a configuration in which, of the sides constituting the outer edge of the positive electrode, only the side having the tab is defined by the non-formation region (uncoated region) of the positive electrode active material layer, and the sides other than the side having the tab are defined by the formation region of the positive electrode active material layer.

The positive electrode active material layer contains a positive electrode active material, and usually further contains a binder and a conductive auxiliary agent. The positive electrode active material is usually made from a granular material, and a binder is contained in the positive electrode active material layer for sufficient contact and shape retention between particles. Furthermore, a conductive auxiliary agent is preferably included in the positive electrode active material layer in order to facilitate transfer of electrons promoting cell reaction.

The positive electrode active material is a substance directly involved in the transfer of electrons in the secondary battery, and is a main substance of the positive electrode which is responsible for charging and discharging, that is, cell reaction. More specifically, ions are brought in an electrolyte due to "the positive electrode active material contained in the positive electrode active material layer," and such ions move between the positive electrode and the negative electrode so that electrons are transferred, and charging and discharging are performed. In particular, the positive electrode active material layer is a layer capable of occluding and releasing lithium ions. Lithium ions move between the positive electrode and the negative electrode through the electrolyte so that charging and discharging of the battery are performed.

The positive electrode active material is not particularly limited as long as the positive electrode active material is a material that contributes to occlusion and release of lithium ions. However, from the viewpoint of controlling the discharge capacity of the positive electrode active material and further improving the cycle characteristics, a lithium-containing composite oxide is preferably contained. The lithium-containing composite oxide is usually a lithium transition metal composite oxide. The transition metal may be any transition metal (transition element), and examples of the transition metal include a first transition element, a second transition element, and a third transition element. Preferable transition metal is the first transition element.

From the viewpoint of controlling the discharge capacity of the positive electrode active material and further improving the cycle characteristics, the positive electrode active material is preferably a lithium transition metal composite oxide containing at least one kind of transition metal selected from a group consisting of lithium, scandium, titanium, vanadium, chromium, manganese, iron, cobalt, nickel, copper, and zinc (particularly a group consisting of cobalt, nickel, manganese, and iron). As a specific example of such a lithium transition metal composite oxide, for example, there is lithium cobaltate, lithium nickelate, lithium manganate, lithium iron phosphate, or part of these kinds of transition metal replaced (particularly doped) with another kind of metal. Examples of another kind of metal (dope metal) include one or more kinds of metal selected from a group consisting of aluminum, magnesium, zirconium, nickel, manganese, and titanium. From the viewpoint of controlling the discharge capacity of the positive electrode active material and further improving the cycle characteristics, the positive electrode active material preferably contains lithium cobaltate.

From the viewpoint of controlling the discharge capacity of the positive electrode active material and further improving the cycle characteristics, the positive electrode active material more preferably contains a lithium cobaltate-based compound as a main component. That the positive electrode active material contains a lithium cobaltate-based compound as a main component means that the content of the lithium cobaltate compound relative to the positive electrode active material is 50% by weight or more. From a similar viewpoint, the content of the lithium cobaltate-based compound is more preferably 80% by weight or more, and most preferably 100% by weight relative to the positive electrode active material.

Lithium cobaltate-based compounds include pure lithium cobaltate represented by the chemical formula of $LiCoO_2$ and doped lithium cobaltate in which part of cobalt is replaced (particularly doped) with another kind of metal in the lithium cobaltate. From the viewpoint of controlling the discharge capacity of the positive electrode active material and further improving the cycle characteristics, doped lithium cobaltate is preferable. In the doped lithium cobaltate, other kinds of metal (dope metal) includes, for example, one or more kinds of metal selected from a group consisting of aluminum, magnesium, zirconium, nickel, manganese, and titanium, or, from a similar viewpoint, preferably two or more kinds of metal selected from the group. Other kinds of metal (dope metal) more preferable from a similar viewpoint include one of aluminum and magnesium as the two or more kinds of metal. From the viewpoint of controlling the discharge capacity of the positive electrode active material and further improving the cycle characteristics, a substitution amount (doping amount) is usually 0.001 parts by weight to 5 parts by weight, or preferably 0.1 parts by weight to 5 parts by weight with respect to 100 parts by weight of cobalt in the doped lithium cobaltate. From the viewpoint of controlling the discharge capacity of the positive electrode active material under an environment of a relatively higher end-of-charge voltage (for example, 4.45 V to 4.47 V) and further improving the cycle characteristics, the substitution amount (doping amount) is preferably 0.8 parts by weight to 5 parts by weight, more preferably 1 part by weight to 5 parts by weight with respect to 100 parts by weight of cobalt in the doped lithium cobaltate. In a case where the doped lithium cobaltate contains two or more kinds of metal as other kinds of metal (dope metal), a total substitution amount (total doping amount) is preferably within the above range.

In the present description, the doping amount of the positive electrode active material has a value measured by quantitative analysis by ICP analysis.

From the viewpoint of controlling the discharge capacity of the positive electrode active material and further improving the cycle characteristics, an average particle diameter D50 of the positive electrode active material is preferably 5 µm to 30 µm, more preferably 10 µm to 25 µm, or further preferably 12 µm to 20 µm.

In the present description, the average particle diameter D50 has a value measured by a laser diffraction particle size distribution measuring apparatus (LA960 manufactured by Horiba, Ltd.).

From the viewpoint of controlling the discharge capacity of the positive electrode active material and further improving the cycle characteristics, a specific surface area of the positive electrode active material is preferably 0.05 $m^2$/g to 2 $m^2$/g, more preferably 0.1 $m^2$/g to 1 $m^2$/g, or further preferably 0.15 $m^2$/g to 0.5 $m^2$/g.

In the present description, the specific surface area has a value measured by a specific surface area measuring apparatus (Macsorb manufactured by MOUNTECH Co. Ltd.).

The positive electrode active material can be obtained as a commercially available product, or can also be produced by a publicly-known method. For example, in a case where the positive electrode active material is manufactured, a publicly-known producing method of an inorganic compound can be used. Specifically, a plurality of compounds as raw materials are weighed so as to have a desired composition ratio, mixed uniformly, and fired, so that the positive electrode active material can be produced. Examples of the compounds as raw materials include, for example, a lithium-containing compound, a transition element-containing compound, a typical element-containing compound, and an anion-containing compound. As the lithium-containing compound, for example, hydroxide, chloride, nitrate, carbonate, and the like of lithium can be used. As the transition element-containing compound, for example, oxide, hydroxide, chloride, nitrate, carbonate, sulfate, organic acid salt, and the like of a transition element can be used. As specific examples of the transition element-containing compound, in a case where the transition element is Co, Mn and Fe, for example, there are manganese dioxide, γ-MnOOH, manganese carbonate, manganese nitrate, manganese hydroxide, $Co_3O_4$, CoO, cobalt hydroxide, $Fe_2O_3$, $Fe_3O_4$, and the like. As the typical element-containing compound, for example, oxide, hydroxide, chloride, nitrate, carbonate, sulfate, organic acid salt, and the like of a typical element can be used. As the anion-containing compound, in a case where the anion is fluorine, for example, lithium fluoride and the like can be used. A firing temperature is usually 400° C. to 1200° C. Firing may be performed in air, vacuum, oxygen atmosphere, hydrogen atmosphere, or an inert gas atmosphere of nitrogen, rare gas, and the like.

The content of the positive electrode active material is usually 90% to 99% by weight, or preferably 95% to 99% by weight with respect to a total weight (solid content weight) of the positive electrode active material layer. The positive electrode active material layer may contain two or more kinds of the positive electrode active materials, and in that case, the total content of the positive electrode active materials is preferably within the above range.

The binder that may be contained in the positive electrode active material layer is not particularly limited. As the binder of the positive electrode active material layer, for example, there is at least one kind selected from a group consisting of polyvinylidene fluoride (PVdF), vinylidene fluoride-hexafluoropropylene copolymer, vinylidene fluoride-tetrafluoroethylene copolymer, polytetrafluoroethylene, and the like. From the viewpoint of controlling the discharge capacity of the positive electrode active material and further improving the cycle characteristics, the binder of the positive electrode active material preferably contains polyvinylidene fluoride (PVdF).

The content of the binder of the positive electrode active material layer is, with respect to the total weight (solid content weight) of the positive electrode active material layer, usually 0.1% by weight to 5% by weight, or, from the viewpoint of controlling the discharge capacity of the positive electrode active material and further improving the cycle characteristics, preferably 0.5% by weight to 3% by weight, or more preferably 0.5% by weight to 2% by weight. The positive electrode active material layer may contain two or more kinds of the binders, and in that case, the total content of the binders is preferably within the above range.

The conductive auxiliary agent that may be contained in the positive electrode active material layer is not particularly limited. As the conductive auxiliary agent of the positive electrode active material layer, for example, there is at least one kind selected from a group consisting of carbon black, such as thermal black, furnace black, channel black, ketjen black, acetylene black, and the like, graphite, a carbon fiber, such as carbon nanotube and vapor phase growth carbon fiber, metal powder of copper, nickel, aluminum, silver, and the like, polyphenylene derivative, and the like. The conductive auxiliary agent of the positive electrode active material layer preferably contains a carbon fiber (particularly a carbon nanotube) from the viewpoint of controlling the discharge capacity of the positive electrode active material and further improving the cycle characteristics.

An average diameter of the carbon fibers (particularly carbon nanotubes) is usually 1 nm to 20 nm, preferably 2 nm to 12 nm. An average chain length of the carbon fibers (particularly carbon nanotubes) is usually 0.05 μm to 500 μm, preferably 0.1 μm to 300 μm. The average diameter and the average chain length are the average values of optional 100 carbon fibers.

The content of the conductive auxiliary agent of the positive electrode active material layer is, with respect to the total weight (solid content weight) of the positive electrode active material layer, usually 0.1% by weight to 5% by weight, or, from the viewpoint of controlling the discharge capacity of the positive electrode active material and further improving the cycle characteristics, preferably 0.5% by weight to 2% by weight. The positive electrode active material layer may contain two or more kinds of the conductive auxiliary agents, and in that case, the total content of the conductive auxiliary agents is preferably within the above range.

The positive electrode active material layer can be obtained by, for example, applying positive electrode slurry obtained by dispersing a positive electrode active material, the binder to be added if desired, and the conductive auxiliary agent in a solvent to a positive electrode current collector and drying the positive electrode slurry, and consolidating (rolling) the positive electrode slurry by a roll press or the like. The density can be controlled by adjusting the pressure during the consolidation. The solvent of the positive electrode slurry is not particularly limited, and usually a solvent capable of dissolving the binder is used. As the solvent of the positive electrode slurry, for example, there are organic solvents, such as N-methylpyrrolidone, toluene, tetrahydrofuran, cyclohexane, and methyl ethyl ketone, and water. A single-side coating amount of the positive electrode slurry is preferably within a range in which the basis weight of the positive electrode active material layer described above is achieved after drying. From the viewpoint of controlling the discharge capacity of the positive electrode active material and further improving the cycle characteristics, in a preferred embodiment, the positive electrode active material and the binder in the positive electrode active material layer are a combination of a lithium cobaltate-based compound (particularly doped lithium cobaltate) and polyvinylidene fluoride.

The positive electrode current collector used for the positive electrode is a member that contributes to collecting and supplying electrons generated in the positive electrode active material due to a cell reaction. Such a positive electrode current collector may be a sheet-like metal member and may have a porous or perforated form. For example, the positive electrode current collector may be metal foil, punching metal, a net, expanded metal, or the like. The positive electrode current collector used for the positive electrode is preferably made from metal foil containing at least one kind selected from a group consisting of aluminum, stainless steel, nickel, and the like, and may be, for example, an aluminum foil.

The density of the positive electrode active material layer is usually 3.5 g/cm$^3$ to 4.5 g/cm$^3$, or, from the viewpoint of controlling the discharge capacity of the positive electrode active material and further improving the cycle characteristics, preferably 3.6 g/cm$^3$ to 4.4 g/cm$^3$, more preferably 3.7 g/cm$^3$ to 4.3 g/cm$^3$, still more preferably 3.8 g/cm$^3$ to 4.2 g/cm$^3$.

In the present description, the density of the positive electrode active material layer has a value calculated by dividing the mass of the layer by the volume of the layer. The mass of the positive electrode active material layer can be obtained by weighing the positive electrode active material layer peeled from the positive electrode current collector. The volume of the positive electrode active material layer can be obtained from the product of the thickness of the positive electrode active material layer and the formation area of the positive electrode active material layer, where the thickness of the positive electrode active material layer is calculated by subtracting the thickness of the positive electrode current collector from the thickness of the positive electrode.

(Negative Electrode)

The negative electrode 2 has at least the negative electrode active material layer 20. The negative electrode 2 is usually composed of the negative electrode active material layer 20 and a negative electrode current collector (foil) 21, and the negative electrode active material layer 20 is provided on at least one surface of the negative electrode current collector 21. For example, in the negative electrode, the negative electrode active material layer may be provided on both surfaces of the negative electrode current collector, or the negative electrode active material layer may be provided only on one surface of the negative electrode current collector. In the negative electrode that is preferable from the viewpoint of further increasing the capacity of the secondary battery, the negative electrode active material layer is provided on both surfaces of the negative electrode current collector. A secondary battery usually includes a plurality of negative electrodes, and may include one or more negative electrodes having a negative electrode active material layer provided on both surfaces of the negative electrode current collector, and one or more negative electrodes having a negative electrode active material layer provided on one surface of the negative electrode current collector. The negative electrode usually has a negative electrode active material layer on an entire negative electrode active material layer forming surface of the negative electrode current collector.

For example, in a case where the negative electrode has a rectangular shape, the negative electrode may have a configuration in which, in the negative electrode active material layer forming surface of the negative electrode, only a tab portion is a non-formation region (uncoated region) of the negative electrode active material layer, and the other portions are a formation region of the negative electrode active material layer. In a similar case, the negative electrode may have a configuration in which, of the sides constituting the outer edge of the negative electrode, only the side having the tab is defined by the non-formation region (uncoated region) of the negative electrode active material layer, and the sides other than the side having the tab are defined by the formation region of the negative electrode active material layer.

The negative electrode active material layer contains a negative electrode active material, and usually further contains a binder and a conductive auxiliary agent, like the positive electrode active material layer. The negative electrode active material is usually made from a granular material, and a binder is contained in the negative electrode active material layer for sufficient contact and shape retention between particles. Furthermore, a conductive auxiliary agent is preferably included in the negative electrode active material layer in order to facilitate transfer of electrons promoting cell reaction.

The negative electrode active material contained in the negative electrode active material layer is, like the positive electrode active material contained in the positive electrode active material layer, also a substance directly involved in the transfer of electrons in the secondary battery, and is a main substance of the negative electrode which is responsible for charging and discharging, that is, cell reaction. More specifically, ions are brought in an electrolyte due to "the negative electrode active material contained in the negative electrode active material layer," and such ions move between the positive electrode and the negative electrode so that electrons are transferred, and charging and discharging are performed. In particular, the negative electrode active material layer is a layer capable of occluding and releasing lithium ions.

The negative electrode active material is not particularly limited as long as the negative electrode active material is a substance that contributes to occlusion and release of lithium ions, and is preferably, for example, various carbon materials, oxides, lithium alloys, silicon, silicon alloys, tin alloys, and the like. From the viewpoint of controlling the discharge capacity of the positive electrode active material and further improving the cycle characteristics, the negative electrode active material is preferably a carbon material.

As various carbon materials of the negative electrode active material, there are, for example, graphite (for example, natural graphite, artificial graphite, mesocarbon microbeads (MCMB), non-graphitizable carbon, graphitizable carbon), hard carbon, soft carbon, diamond-like carbon, and the like. In particular, graphite is preferable for having high electron conductivity, excellent adhesion to a negative electrode current collector, and the like. As the oxide of the negative electrode active material, there is at least one kind selected from a group consisting of silicon oxide [$SiO_x$ ($0.5 \leq x \leq 1.5$)], tin oxide, indium oxide, zinc oxide, lithium oxide, and the like. The lithium alloy of the negative electrode active material may be any metal which may be alloyed with lithium, and is preferably, for example, a binary, ternary or higher alloy of metal, such as Al, Si, Pb, Sn, In, Bi, Ag, Ba, Ca, Hg, Pd, Pt, Te, Zn, La, and the like, and lithium. It is preferable that such an oxide and a lithium alloy be amorphous as a structural form of the oxide and the lithium alloy. This is because degradation due to nonuniformity, such as crystal grain boundaries or defects, is hardly generated. From the viewpoint of controlling the discharge capacity of the positive electrode active material and further improving the cycle characteristics, the negative electrode active material preferably contains a carbon material, and more preferably contains graphite (particularly artificial graphite).

The reversible capacity of the negative electrode active material is usually 300 mAh/g to 1000 mAh/g, or, from the viewpoint of controlling the discharge capacity of the positive electrode active material and further improving cycle characteristics, preferably 330 mAh/g to 370 mAh/g.

The reversible capacity of the negative electrode active material is an intrinsic physical property value of the negative electrode active material, and is the discharge capacity (mAh/g) when charging and discharging are performed under mild conditions using the negative electrode and lithium metal as a counter electrode.

From the viewpoint of controlling the discharge capacity of the positive electrode active material and further improving the cycle characteristics, the negative electrode active material more preferably contains graphite (particularly artificial graphite) as a main component. That the negative electrode active material contains graphite (particularly artificial graphite) as a main component means that the content of the graphite (particularly artificial graphite) relative to the negative electrode active material is 50% by weight or more. From a similar viewpoint, the content of the graphite (particularly artificial graphite) is more preferably 80% by weight or more, and most preferably 100% by weight relative to the negative electrode active material.

The average particle diameter D50 of the negative electrode active material is usually 5 μm to 30 μm, or, from the viewpoint of controlling the discharge capacity of the positive electrode active material and further improving the cycle characteristics, more preferably 10 μm to 25 μm, or further preferably 12 μm to 20 μm.

A specific surface area of the negative electrode active material is usually 0.5 $m^2/g$ to 10 $m^2/g$, or, from the viewpoint of controlling the discharge capacity of the positive electrode active material and further improving the cycle characteristics, preferably 1 $m^2/g$ to 5 $m^2/g$, or more preferably 1.5 $m^2/g$ to 3 $m^2/g$.

The content of the negative electrode active material is usually 90% to 99% by weight, or preferably 95% to 99% by weight with respect to a total weight (solid content weight) of the negative electrode active material layer. The negative electrode active material layer may contain two or more kinds of the negative electrode active materials, and in that case, the total content of the negative electrode active materials is preferably within the above range.

The binder that may be contained in the negative electrode active material layer is not particularly limited. As the binder of the negative electrode active material layer, there is at least one kind selected from a group consisting of styrene butadiene rubber (SBR), polyacrylic acid, polyvinylidene fluoride (PVdF), polyimide resin, and polyamide imide resin. From the viewpoint of controlling the discharge capacity of the positive electrode active material and further improving the cycle characteristics, the binder of the negative electrode active material layer preferably contains styrene butadiene rubber.

The content of the binder of the negative electrode active material layer is, with respect to the total weight (solid content weight) of the negative electrode active material layer, usually 0.1% by weight to 5% by weight, or, from the viewpoint of controlling the discharge capacity of the positive electrode active material and further improving the cycle characteristics, preferably 0.5% by weight to 3% by weight, or more preferably 1% by weight to 3% by weight. The negative electrode active material layer may contain two or more kinds of the binders, and in that case, the total content of the binders is preferably within the above range.

The conductive auxiliary agent that may be contained in the negative electrode active material layer is not particularly limited. As the conductive auxiliary agent of the negative electrode active material layer, for example, there is at least one kind selected from a group consisting of carbon black, such as thermal black, furnace black, channel black, ketjen black, acetylene black, and the like, a carbon fiber, such as carbon nanotube and vapor phase growth carbon fiber, metal powder of copper, nickel, aluminum, silver, and the like, polyphenylene derivative, and the like.

The content of the conductive auxiliary agent of the negative electrode active material layer is usually 0% to 5% by weight, or preferably 0.5% to 2% by weight with respect to a total weight (solid content weight) of the negative electrode active material layer. The negative electrode active material layer may contain two or more kinds of the conductive auxiliary agents, and in that case, the total content of the conductive auxiliary agents is preferably within the above range. Note that, in a case where graphite is used as the negative electrode active material, the conductive auxiliary agent is not usually used.

The negative electrode active material layer may contain a thickener. As the thickener, for example, there is carboxymethyl cellulose (CMC), polyacrylic acid, and the like.

The content of the thickener of the negative electrode active material is usually 0.1% to 5% by weight, or preferably 0.5% to 2% by weight with respect to a total weight (solid content weight) of the negative electrode active material layer. The negative electrode active material layer may contain two or more kinds of the thickeners, and in that case, the total content of the thickeners is preferably within the above range.

The negative electrode active material layer can be obtained by, for example, applying negative electrode slurry obtained by dispersing a negative electrode active material, the binder to be added if desired, the conductive auxiliary agent, and the thickener in a solvent to a negative electrode current collector and drying the negative electrode slurry, and consolidating (rolling) the negative electrode slurry by a roll press or the like. The solvent of the negative electrode slurry is not specifically limited, and a solvent that is similar to the one illustrated as a solvent of the positive electrode slurry is used. A single-side coating amount of the negative electrode slurry is preferably within a range in which the basis weight of the negative electrode active material layer described above is achieved after drying. From the viewpoint of controlling the discharge capacity of the positive electrode active material and further improving the cycle characteristics, in a preferred embodiment, the negative electrode active material and the binder in the negative electrode active material layer are a combination of graphite (particularly artificial graphite) and styrene butadiene rubber.

The negative electrode current collector used for the negative electrode is a member that contributes to collecting and supplying electrons generated in the positive electrode active material due to a cell reaction. Such a current collector may be a sheet-like metal member and may have a porous or perforated form. For example, like the positive electrode current collector, the negative electrode current collector may be metal foil, punching metal, a net, expanded metal, or the like. The negative electrode current collector used for the negative electrode is preferably made from metal foil containing at least one kind selected from a group consisting of copper, stainless steel, nickel, and the like, and may be, for example, copper foil.

The density of the negative electrode active material layer is usually 1.0 g/cm$^3$ to 1.9 g/cm$^3$, or, from the viewpoint of controlling the discharge capacity of the positive electrode active material and further improving the cycle characteristics, preferably 1.2 g/cm$^3$ to 1.85 g/cm$^3$, or more preferably 1.5 g/cm$^3$ to 1.8 g/cm$^3$.

In the present description, the density of the negative electrode active material layer has a value calculated by dividing the mass of the layer by the volume of the layer. The mass of the negative electrode active material layer can be obtained by weighing the negative electrode active material layer peeled from the negative electrode current collector. The volume of the negative electrode active material layer can be obtained from the product of the thickness of the negative electrode active material layer and the formation area of the negative electrode active material layer, where the thickness of the negative electrode active material layer is calculated by subtracting the thickness of the negative electrode current collector from the thickness of the negative electrode.

(Separator)

The separator is not particularly limited as long as the separator can allow ions to pass through while preventing electrical contact between the positive electrode and the negative electrode. A material which constitutes the separator is not particularly limited as long as the electrical contact between the positive electrode and the negative electrode can be prevented, and, for example, an electrically insulating polymer and the like are used. As the electrically insulating polymer, for example, there are polyolefin (for example, polyethylene, polypropylene), polyester, polyimide, polyamide, polyamideimide, aramid, cellulose, and the like. Preferably, the separator is a porous or microporous insulating member and has a film form due to a small thickness of the separator. A microporous film made from polyolefin, which is merely an example, may be used as the separator. A surface of the separator may be covered with an inorganic particle coat layer, and/or an adhesive layer, or the like. The surface of the separator may have adhesive properties.

The separator and the positive electrode and/or the negative electrode may be adhered to each other. The adhesion can be performed by using an adhesive separator as the separator, applying an adhesive binder on the electrode material layer (the positive electrode active material layer and/or the negative electrode active material layer), and/or thermocompression bonding. An adhesive agent can be used to impart adhesiveness or adhesive strength to the separator or the electrode active material layer. As the adhesive agent, polyvinylidene fluoride, an acrylic adhesive agent, or the like can be used. Further, filler particles of alumina, silica, and the like may be used with the adhesive agent.

The thickness of the separator is not particularly limited, and may be, for example, 1 μm to 100 μm, particularly 5 μm to 20 μm. The thickness of the separator is the thickness inside the secondary battery.

(Nonaqueous Electrolyte)

The nonaqueous electrolyte assists movement of lithium ions released from the electrodes (the positive electrode/the negative electrode). The nonaqueous electrolyte includes a nonaqueous solvent and an electrolyte salt. The nonaqueous electrolyte may have a form of liquid, gel, or the like (note that, in the present description, the "liquid" nonaqueous electrolyte is also referred to as the "nonaqueous electrolyte solution").

The nonaqueous solvent for the nonaqueous electrolyte is not particularly limited, and for example, there is at least one kind selected from a group consisting of a carbonate-based solvent, an ester-based solvent, a sultone-based solvent, a nitrile-based solvent, and the like, and fluorides of these. From the viewpoint of controlling the discharge capacity of the positive electrode active material and further improving the cycle characteristics, the nonaqueous electrolyte preferably contains a carbonate-based solvent as the nonaqueous solvent.

The carbonate-based solvent contains cyclic carbonates and/or chain carbonates, and, from the viewpoint of controlling the discharge capacity of the positive electrode active material and further improving cycle characteristics, preferably contains cyclic carbonates and chain carbonates. As the cyclic carbonates, for example, there is at least one kind selected from a group consisting of propylene carbonate (PC), ethylene carbonate (EC), fluoroethylene carbonate (FEC), butylene carbonate (BC), and vinylene carbonate (VC). As the chain carbonates, for example, there is at least one kind selected from a group consisting of dimethyl carbonate (DMC), diethyl carbonate (DEC), ethyl methyl carbonate (EMC) and dipropyl carbonate (DPC). The content of the carbonate-based solvent is usually 20% by volume or more, or, from the viewpoint of controlling the discharge capacity of the positive electrode active material and further improving the cycle characteristics, preferably 25% by volume or more, or more preferably 30% by volume or more with respect to the nonaqueous solvent of the nonaqueous electrolyte.

As the ester solvent, for example, there is at least one kind selected from a group consisting of methyl formate, ethyl formate, propyl formate, methyl acetate, ethyl acetate, propyl acetate, methyl propionate, ethyl propionate, propyl propionate (PP), and methyl butyrate.

As the sultone solvent, for example, there is at least one kind selected from a group consisting of propane sultone (PS) and propene sultone.

As the nitrile solvent, for example, there is at least one kind selected from a group consisting of adiponitrile (ADN), succinonitrile, suberonitrile, acetonitrile, glutaronitrile, methoxyacetonitrile, and 3-methoxypropionitrile.

From the viewpoint of controlling the discharge capacity of the positive electrode active material and further improving the cycle characteristics, the nonaqueous solvent preferably contains cyclic carbonates and a chain solvent. The chain solvent contains the chain carbonates and the ester-based solvent described above. A volume ratio of the cyclic carbonates to the chain solvent (the cyclic carbonates/the chain solvent) is usually 20/80 to 80/20, or, from the viewpoint of controlling the discharge capacity of the positive electrode active material and further improving the cycle characteristics, preferably 25/75 to 75/25, or more preferably 30/70 to 70/30.

As the electrolyte salt of the nonaqueous electrolyte, for example, Li salts, such as $LiPF_6$, $LiBF_4$, $LiClO_4$, $LiCF_3SO_3$, $Li(CF_3SO_2)_2N$, $Li(C_2F_5SO_2)_2N$, $Li(CF_3)_2N$, and $LiB(CN)_4$, are preferably used. A preferable electrolyte salt is $LiPF_6$ from the viewpoint of controlling the discharge capacity of the positive electrode active material and further improving the cycle characteristics.

The concentration of the electrolyte salt in the nonaqueous electrolyte is not particularly limited, and may be, for example, 0.1 mol/L to 4 mol/L, or, from the viewpoint of controlling the discharge capacity of the positive electrode active material and further improving the cycle characteristics, preferably 0.5 mol/L to 2 mol/L.

[Manufacture of Secondary Battery]

The secondary battery can be manufactured by enclosing an electrode assembly including a positive electrode, a negative electrode, and a separator and a nonaqueous electrolyte in an exterior body, and then performing initial charging. An aging process may be further performed after the initial charging process.

The exterior body may be a flexible pouch (soft bag) or a hard case (hard housing).

In a case where the exterior body is a flexible pouch, the flexible pouch is usually formed of a laminate film, and a peripheral portion is heat-sealed so that sealing and enclosing are performed. As the laminate film, a film formed by laminating metal foil and a polymer film is generally used. Specifically, one having a three-layer configuration composed of an outer layer polymer film/metal foil/an inner layer polymer film is exemplified. The outer layer polymer film is for preventing the metal foil from being damaged due to permeation of moisture and the like, contact, and the like, and polymers, such as polyamide and polyester, can be suitably used. The metal foil is for preventing permeation of moisture and gas, and foil of copper, aluminum, stainless steel, or the like can be suitably used. The inner layer polymer film protects the metal foil from the electrolyte contained in the inside and is for melting and sealing at the time of heat sealing, and polyolefin or acid-modified polyolefin can be suitably used. The thickness of the laminate film is not particularly limited, and is preferably, for example, 1 μm to 1 mm.

In a case where the exterior body is a hard case, the hard case is usually formed of a metal plate, and a peripheral portion is irradiated with laser so that sealing and enclosing are performed. As the metal plate, a metal material made from aluminum, nickel, iron, copper, stainless steel or the like is generally used. The thickness of the metal plate is not particularly limited, and is preferably, for example, 1 μm to 1 mm.

A secondary battery usually has two external terminals. The two external terminals are connected to an electrode (positive electrode or negative electrode) via a current collecting lead, and as a result, are led out from the exterior body.

The initial charging process is a first charging process performed for the purpose of forming a solid electrolyte interface coating (hereinafter referred to as the "SEI coating") on a negative electrode surface, and is also referred to as a conditioning process or a formation process. The SEI coating is formed by reducing and decomposing an additive contained in the electrolyte on the negative electrode surface in the present process, and prevents further decomposition of the additive on the negative electrode surface during use as a secondary battery. The SEI coating usually contains one or more kinds of materials selected from a group consisting of LiF, $Li_2CO_3$, LiOH, and LiOCOOR (where R represents a monovalent organic group, such as an alkyl group). As such SEI coating is formed uniformly on the negative electrode surface, decomposition of an electrolyte component in the secondary battery is prevented, and capacity stabilization and extension of life of the secondary battery can be achieved.

In the initial charging process, charging only needs to be performed at least once. Usually, charge and discharge are performed one time or more. One time of charging and discharging include one time of charging and one time of discharging after the charging. If charging and discharging are performed twice or more, the charging and discharging are repeated for the number of times of the charging and the discharging. The number of times of charging and discharging performed in the present process is usually one to three.

A charging method may be a constant current charging method, a constant voltage charging method, or a combination of these. For example, constant voltage charging and constant voltage charging may be repeated during one time of charging. A charging condition is not particularly limited as long as the SEI coating is formed. From the viewpoint of further improving the uniformity of the thickness of the SEI coating, the constant voltage charging is preferably performed after the constant current charging is performed. In a case where the constant voltage charging is performed after the constant current charging is performed, the charging condition described below is preferably employed from the viewpoint of further improving the uniformity of the SEI coating thickness.

Constant Current Charging Method:

Constant current charging is performed at a constant current value of 0.01 C to 3 C, particularly 0.05 C to 2 C until a voltage value of 1 V to 6 V, particularly 3 V to 5 V, is obtained. Here, 1 C is a current value when the rated capacity of the secondary battery is discharged in one hour.

Constant Voltage Charging Method:

The constant voltage charging is performed at the voltage value obtained by the constant current charging until a predetermined value smaller than the constant current value at the time of the constant current charging is obtained or until a predetermined time elapses.

A discharging method may usually be a constant current discharging method, a constant voltage discharging method, or a combination of these. A discharging condition is not particularly limited as long as the SEI coating is formed. From the viewpoint of further improving the uniformity of the thickness of the SEI coating, the constant current discharging is preferably performed. In a case where the constant current discharging is performed, the discharging condition described below is preferably employed from the viewpoint of further improving the uniformity of the SEI coating thickness.

Constant Current Discharging Method:

Constant current discharging is performed at a constant current value of 0.1 C to 3 C, particularly 0.2 C to 2 C until a voltage value of 1 V to 4 V, particularly 2 V to 3.5 V, is obtained.

In the initial charging process, the secondary battery is usually maintained at a temperature within the range of 25° C. to 100° C., or maintained at a temperature preferably within the range of 35° C. to 90° C., or more preferably within the range of 40° C. to 85° C.

The aging process is a process of stabilizing the SEI coating by leaving the secondary battery after the initial charging process in an open circuit state. The aging process is also referred to as a ripening process.

In the aging process, the temperature of the secondary battery is not particularly limited, and may be maintained, for example, within a range of 15° C. to 80° C. The secondary battery is preferably maintained at a temperature within the range of 20° C. to 75° C., or more preferably maintained at a temperature within the range of 25° C. to 70° C. from the viewpoint of further stabilization of the SEI coating. Specifically, the temperature can be maintained within the above range by leaving the secondary battery in space set at a constant temperature.

The leaving time in the aging process is not particularly limited as long as the stabilization of the SEI coating is promoted, and is usually 10 minutes to 30 days, or, from the viewpoint of further stabilization of the SEI coating, preferably within the range of 30 minutes to 14 days, or more preferably within the range of 1 hour to 7 days.

EXAMPLES

<Example/Comparative Example>

(Manufacture of Positive Electrode)

As the positive electrode active material, lithium cobaltate (LCO1) shown in Table 1 was used. In this example, 97.5% by weight of LCO1, 1.0% by weight of carbon nanotubes having an average diameter of 5 nm and an average chain length of 200 μm as a conductive auxiliary agent, and 1.5% by weight of polyvinylidene fluoride as a binder were used. These were mixed with NMP to obtain positive electrode mixture slurry. Next, the positive electrode mixture slurry was applied uniformly to aluminum foil having a thickness of 10 μm and rolled with a roll press, so that a single-sided positive electrode having the positive electrode active material layer on one surface was obtained. The basis weight (per surface) of the positive electrode active material layer of the positive electrode was 19.0 mg/cm$^2$, and the density was 4.10 g/cm$^3$. The basis weight and density of the positive electrode active material layer were common in an example and a comparative example.

TABLE 1

| Positive electrode active material | Doping element, doping amount | D50 (μm) | SSA (m2/g) |
|---|---|---|---|
| LCO1 | Mg: 1 part by weight Zr: 0.05 parts by weight | 17 | 0.2 |

(Manufacture of Negative Electrode)

Artificial graphite (AG1) shown in Table 2 was used as the negative electrode active material. In this example, 97.0% by weight of AG1, 2.0% by weight of styrene-butadiene rubber as a binder, and 1.0% by weight of carboxymethylcellulose as a thickener were used. These were mixed with water to obtain negative electrode mixture slurry. Next, the negative electrode mixture slurry was applied uniformly to copper foil having a thickness of 6 μm and rolled with a roll press, so that a single-sided negative electrode having the negative electrode active material layer on one surface was obtained. The basis weight (per surface) of the negative electrode active material layer of the negative electrode was 10.0 mg/cm$^2$, and the density was 1.70 g/cm$^3$. The basis weight and density of the negative electrode active material layer were common in the example and the comparative example.

TABLE 2

| Negative electrode active material | Graphite kind | D50 (µm) | SSA (m2/g) | Reversible capacity (mAh/g) | Initial efficiency (%) |
|---|---|---|---|---|---|
| AG1 | Artificial graphite | 14 | 2.0 | 350 | 92.0 |

(Manufacture of Electrolyte)

LiPF$_6$ was dissolved in 98 parts by volume of a solution in which a volume ratio of ethylene carbonate and diethyl carbonate is 3:7 so that the concentration in the electrolyte is 1 mol/L, and 2 parts by volume of vinylene carbonate was mixed, so that an electrolyte was obtained.

(Manufacture of Battery)

A single-sided positive electrode, a single-sided negative electrode, and an electrolyte manufactured according to the above method were enclosed in a laminate exterior body together with a separator to manufacture a laminated lithium ion secondary battery. The single-sided positive electrode and the single-sided negative electrode were disposed so that the positive electrode active material layer and the negative electrode active material layer faced each other with the separator interposed between them. An external terminal was provided in the positive electrode and the negative electrode, led out from the exterior body, and used for charging and discharging. Sizes of the positive electrode and the negative electrode were as shown in Tables 3 and 4. The "gap between the positive electrode and the negative electrode" was as shown in Tables 3 and 4. A ratio of the entire area of the negative electrode active material layer in the negative electrode to areas of facing portions of the positive electrode (particularly the positive electrode active material layer) and the negative electrode (particularly the negative electrode active material layer) was calculated as an "area ratio (%)." As a separator 14, a separator (11-µm thick) provided with an adhesive layer made from polyvinylidene fluoride and alumina particles on both surfaces of a polyethylene microporous film was used.

The initial charging process and the aging process were performed.

In the initial charging process, the constant current charging was performed at 0.5 C under an environment of 60° C. until 4.0 V was obtained, and then the constant voltage charging was performed for 30 minutes at the voltage value.

In the aging process, aging treatment was performed at 60° C. for 24 hours.

(Stabilization of Battery)

Using the above secondary battery, charging and discharging were repeated in a thermostatic bath at 25° C. to perform stabilization of the battery.

Specifically, charging and discharging were repeated until a capacity change rate $[\{(P_n-P_{n+1})/P_{n+1}\}\times 100(\%)]$ between the discharge capacity $P_n$ (mAh) due to the n-th charge and discharge and the discharge capacity $P_{n+1}$ (mAh) due to the (n+1)-th charge and discharge becomes 0.2% or less for the first time. Here, n is an integer of 2 or more. More specifically, among the repeated charging and discharging, charging was performed in a manner that the constant current charging was performed at a current value of 0.5 C until the end-of-charge voltage shown in Tables 3 to 4 was obtained, and then the constant voltage charging was performed for one hour at the end-of-charge voltage. Discharging was performed in a manner that, after 10 minutes of suspension after the completion of charging, the constant current discharging was performed at a current value of 0.2 C until a voltage of 3.0 V was obtained. The capacity at the time of the constant current discharging was measured as the discharge capacity. After the discharging, there was 10 minutes of suspension.

(Initial Cell Capacity)

When the stabilization of the battery was performed as described above, and a capacity change rate $[\{(P_n-P_{n+1})/P_{N-1}\}\times 100(\%)]$ between the discharge capacity $P_n$ (mAh) due to the n-th charge and discharge and the discharge capacity $P_{n+1}$ (mAh) due to the (n+1)-th charge and discharge becomes 0.2% or less for the first time, the discharge capacity $P_{n+1}$ (mAh) due to the (n+1)-th charge and discharge was set to the initial cell capacity.

(Discharge Capacity (mAh/g) Per Unit Weight of Positive Electrode Active Material)

"Discharge capacity (mAh/g) per unit weight of the positive electrode active material" was calculated from the "initial cell capacity" and a weight (g) of the positive electrode active material contained in facing portions of the positive electrode (particularly the positive electrode active material layer) and the negative electrode (particularly the negative electrode active material layer) of the secondary battery. Note that a weight W1 (g) of the positive electrode active material contained in the facing portions of the positive electrode (particularly the positive electrode active material layer) and the negative electrode (particularly the negative electrode active material layer) of the secondary battery was calculated from the following equation:

W1 (g)=area (cm$^2$) of the facing portions of the positive electrode (particularly the positive electrode active material layer) and the negative electrode (particularly the negative electrode active material layer)×basis weight per unit area (mg/cm$^2$) of the positive electrode active material layer×ratio of the positive electrode active material contained in the positive electrode active material layer.

(Initial Efficiency and Reversible Capacity of Negative Electrode Active Material)

The initial efficiency and reversible capacity of the negative electrode active material are values measured by a method described below. A charge and discharge cycle was performed within a range of 0.01 V to 1.5V in a coin cell of counter electrode lithium using a single-sided negative electrode, and a ratio (%) of the discharge capacity of the first cycle to the charge capacity of the first cycle was defined as the initial efficiency. Further, the discharge capacity (mAh/g) of the third cycle was defined as the reversible capacity. The charge and discharge conditions in the charge and discharge cycle were as follows:

Charge: 0.4 mA, 0.01 V, 25° C., constant current constant voltage charging (five hours of constant voltage charging); and Discharge: 0.4 mA, 1.5 V, 25° C., constant current discharging.

(Cycle Test)

Using the above secondary battery, a cycle test was performed in a thermostatic bath at 25° C. Charging was performed in a manner that the constant current charging was performed at a current value of 1.0 C until the end-of-charge voltage shown in Tables 3 to 4 was obtained, and then the constant voltage charging was performed for one hour at the end-of-charge voltage. After 10 minutes of suspension after the completion of charging, the constant current discharging was performed at a current value of 1.0 C until a voltage of 3.0 V was obtained, and 10 minutes of suspension was held after the discharging. This charge and discharge cycle was repeated 400 times. After the above, (401st)

charging and discharge were performed under the following conditions, and the discharge capacity during constant current discharge was defined as "cell capacity after cycle":

Charge: the constant current charging was performed at a current value of 0.5 C until the end-of-charge voltage shown in Tables 3 to 4 was obtained, and then the constant voltage charging was performed for one hour at the end-of-charge voltage; and Discharge: after 10 minutes of suspension after the completion of charging, the constant current discharging was performed at a current value of 0.2 C until a voltage of 3.0 V was obtained.

The ratio of the "cell capacity after cycle" to the "initial cell capacity" was defined as "capacity maintenance ratio after cycle (%)."

The "capacity maintenance ratio after cycle (%)" was evaluated according to the following criteria:
⊙: 88% or more (best):
○: 84% or more (good):
Δ: 80% or more (no problem in practical use (within tolerance)):
x: Less than 80% (practical problem).

Table 3 shows a results of changing the size of the positive electrode and the negative electrode, the gap between the positive electrode and the negative electrode, and the area ratio of the negative electrode to the positive electrode under the condition that the end-of-charge voltage is 4.41 V. Table 4 shows a result of changing the end-of-charge voltage in a cell in which the size, the gap, and the area ratio of the positive electrode and the negative electrodes were fixed.

TABLE 3

|  | Size of positive electrode vertical-by-horizontal (mm × mm) | Size of negative electrode vertical-by-horizontal (mm × mm) | Gap between positive electrode and negative electrode (mm) | Area ratio (%) | End-of-charge voltage (V) | Discharge capacity per unit weight of positive electrode active material (mAh/g) | Capacity change rate $(P_n - P_{n+1})/P_{n+1} \times 100$ (%) | Initial cell capacity $P_{n+1}$ (mAh) | Capacity maintenance ratio after cycle (%) |
|---|---|---|---|---|---|---|---|---|---|
| Comparative example A1 | 50 × 50 | 50 × 50 | 0.0 | 100.0% | 4.41 | 168.5 | 0.13 (n = 4) | 78 | 71.5%X |
| Example A1 | 50 × 50 | 50.2 × 50.2 | 0.1 | 100.8% | 4.41 | 169.6 | 0.13 (n = 4) | 78 | 90.2%⊙ |
| Example A2 | 50 × 50 | 50.4 × 50.4 | 0.2 | 101.6% | 4.41 | 170.8 | 0.13 (n = 4) | 79 | 89.4%⊙ |
| Example A3 | 50 × 50 | 50.6 × 50.6 | 0.3 | 102.4% | 4.41 | 172.2 | 0.13 (n = 4) | 80 | 88.1%⊙ |
| Example A4 | 50 × 50 | 50.8 × 50.8 | 0.4 | 103.2% | 4.41 | 173.9 | 0.13 (n = 4) | 80 | 86.0%○ |
| Example A5 | 50 × 50 | 51.0 × 51.0 | 0.5 | 104.0% | 4.41 | 175.7 | 0.13 (n = 4) | 81 | 82.8%Δ |
| Comparative example A2 | 50 × 50 | 51.2 × 51.2 | 0.6 | 104.9% | 4.41 | 178.8 | 0.13 (n = 4) | 83 | 75.7%X |
| Comparative example A3 | 50 × 50 | 50 × 50 | 0.0 | 100.0% | 4.45 | 173.9 | 0.14 (n = 4) | 80 | 66.2%X |
| Example B1 | 20 × 20 | 20.2 × 20.2 | 0.1 | 102.0% | 4.41 | 171.3 | 0.13 (n = 4) | 13 | 89.1%⊙ |
| Example B2 | 20 × 20 | 20.4 × 20.4 | 0.2 | 104.0% | 4.41 | 174.6 | 0.13 (n = 4) | 13 | 84.9%○ |
| Comparative example B1 | 20 × 20 | 20.6 × 20.6 | 0.3 | 106.1% | 4.41 | 177.7 | 0.13 (n = 4) | 13 | 78.6%X |
| Example C1 | 60 × 60 | 60.4 × 60.4 | 0.2 | 101.3% | 4.41 | 170.4 | 0.13 (n = 4) | 113 | 89.7%⊙ |
| Example C2 | 60 × 60 | 60.8 × 60.8 | 0.4 | 102.7% | 4.41 | 173.0 | 0.13 (n = 4) | 115 | 87.2%○ |
| Comparative example C1 | 60 × 60 | 61.2 × 61.2 | 0.6 | 104.0% | 4.41 | 177.2 | 0.13 (n = 4) | 118 | 79.8%X |

$P_{n+1}$ is discharge capacity due to the (n + 1)-th charge and discharge, and is discharge capacity when a capacity change rate from discharge capacity $P_n$ (mAh) due to the previous charge and discharge becomes 0.2% or less for the first time.

TABLE 4

|  | Size of positive electrode vertical-by-horizontal (mm × mm) | Size of negative electrode vertical-by-horizontal (mm × mm) | Gap between positive electrode and negative electrode (mm) | Area ratio (%) | End-of-charge voltage (V) | Discharge capacity per unit weight of positive electrode active material (mAh/g) | Capacity change rate $(P_n - P_{n+1})/P_{n+1} \times 100$ (%) | Initial cell capacity $P_{n+1}$ (mAh) | Capacity maintenance ratio after cycle (%) |
|---|---|---|---|---|---|---|---|---|---|
| Example D1 | 80 × 80 | 80.2 × 80.2 | 0.1 | 100.5% | 4.41 | 169.0 | 0.13 (n = 4) | 200 | 90.5%⊙ |
| Example D2 | 80 × 80 | 80.2 × 80.2 | 0.1 | 100.5% | 4.43 | 171.3 | 0.14 (n = 4) | 203 | 89.1%⊙ |
| Example D3 | 80 × 80 | 80.2 × 80.2 | 0.1 | 100.5% | 4.45 | 174.5 | 0.14 (n = 4) | 206 | 84.9%○ |
| Example D4 | 80 × 80 | 80.2 × 80.2 | 0.1 | 100.5% | 4.47 | 175.9 | 0.15 (n = 4) | 208 | 80.3%Δ |
| Example D5 | 80 × 80 | 80.6 × 80.6 | 0.3 | 101.5% | 4.41 | 170.9 | 0.13 (n = 4) | 202 | 89.4%⊙ |
| Example D6 | 80 × 80 | 80.6 × 80.6 | 0.3 | 101.5% | 4.43 | 173.4 | 0.14 (n = 4) | 205 | 86.6%○ |
| Example D7 | 80 × 80 | 80.6 × 80.6 | 0.3 | 101.5% | 4.45 | 177.0 | 0.14 (n = 4) | 209 | 80.1%Δ |
| Comparative example D1 | 80 × 80 | 80.6 × 80.6 | 0.3 | 101.5% | 4.47 | 178.5 | 0.15 (n = 4) | 211 | 74.4%X |
| Example D8 | 80 × 80 | 81.0 × 81.0 | 0.5 | 102.5% | 4.41 | 173.2 | 0.13 (n = 4) | 205 | 86.9%○ |
| Example D9 | 80 × 80 | 81.0 × 81.0 | 0.5 | 102.5% | 4.43 | 176.0 | 0.14 (n = 4) | 208 | 82.2%Δ |
| Comparative example D2 | 80 × 80 | 81.0 × 81.0 | 0.5 | 102.5% | 4.45 | 180.0 | 0.14 (n = 4) | 213 | 72.5%X |
| Comparative example D3 | 80 × 80 | 81.0 × 81.0 | 0.5 | 102.5% | 4.47 | 181.6 | 0.15 (n = 4) | 215 | 65.4%X |

$P_{n+1}$ is discharge capacity due to the (n + 1)-th charge and discharge, and is discharge capacity when a capacity change rate from discharge capacity $P_n$ (mAh) due to the previous charge and discharge becomes 0.2% or less for the first time.

In a lithium ion secondary battery in which the ratio of the entire area of the negative electrode active material layer to the area of the opposing portions of the positive electrode active material layer and the negative electrode active material layer is 100.5% to 104.0%, the gap between the positive electrode and the negative electrode is 0.1 mm to 0.5 mm, and the discharge capacity per unit weight of the positive electrode active material contained in the positive electrode active material layer is 169.0 mAh/g to 178.0 mAh/g, the "capacity maintenance ratio after cycle" was 80% or more which is high, and excellent cycle characteristics were obtained in all lithium ion secondary batteries having the end-of-charge voltage of 4.41 V to 4.47V.

Among the secondary batteries having the above-mentioned excellent cycle characteristics, in particular, the secondary battery having the discharge capacity of 169.0 mAh/g to 175.0 mAh/g had the "capacity maintenance ratio after cycle" of 84% or more which is even higher, and more excellent cycle characteristics were obtained.

Among the secondary batteries having the above-mentioned excellent cycle characteristics, in particular, the secondary battery having the discharge capacity of 169.0 mAh/g to 172.5 mAh/g had the "capacity maintenance ratio after cycle" of 88% or more which is further higher, and further excellent cycle characteristics were obtained.

<Measurement Method>

(Doping Element and Doping Amount of Positive Electrode Active Material)

The doping element and the doping amount of the positive electrode active material were measured by quantitative analysis using ICP analysis. The content of the doping element in a case where the amount of Co contained in the positive electrode active material was 100 parts by weight was obtained.

(Average Particle Diameter D50)

The average particle diameter D50 was measured by a laser diffraction particle size distribution measuring apparatus (LA960 manufactured by Horiba, Ltd.). In the present description, a volume-based cumulative 50% diameter (D50) measured by this measuring apparatus is expressed as an average particle diameter.

(Specific Surface Area (SSA))

The specific surface area (SSA) was measured by a specific surface area measuring apparatus (Macsorb manufactured by MOUNTECH Co. Ltd.). In the present description, the specific surface area ($m^2/g$) measured by this measuring apparatus is expressed as SSA.

(Density)

The density of the positive electrode active material layer was calculated by a method described below. The thickness of the positive electrode active material layer is calculated by subtracting the thickness of the positive electrode current collector from the thickness of the positive electrode, the volume of the positive electrode active material layer is calculated from the product of the thickness of the positive electrode active material layer and the formation area of the positive electrode active material layer, and the density is calculated by dividing the weight of the positive electrode active material layer by the volume.

The density of the negative electrode active material layer was calculated according to the method of calculating the density of the positive electrode active material layer described above.

The secondary battery of the present invention can be used in various fields in which storage of electricity is expected. Although it is merely an example, the secondary battery of the present invention can be used in the fields of electric, information, and communications (for example, mobile equipment fields, such as mobile phones, smart phones, smart watches, laptop computers, digital cameras, activity meters, arm computers, electronic papers, and the like) in which mobile equipment is used, home and small industrial applications (for example, electric tools, golf carts, domestic, nursing care, and industrial robot fields), large industrial applications (for example, forklifts, elevators, harbor port crane fields), transportation system fields (for example, fields of hybrid vehicles, electric vehicles, buses, trains, electric assisted bicycles, electric motorcycles, and the like), electric power system applications (for example, fields of various electric power generation, load conditioners, smart grids, general home electric storage systems, and the like), IoT fields, space and deep-sea applications (for example, fields of space explorers, research submarines, and the like), and the like.

The invention claimed is:

1. A lithium ion secondary battery comprising:
a laminated electrode assembly in which a positive electrode having a positive electrode active material layer, a negative electrode having a negative electrode active material layer, and a separator interposed between the positive electrode and the negative electrode are alternately planarly laminated, the laminated lithium ion secondary battery having:
an end-of-charge voltage of 4.41 V to 4.47V,
a ratio of an entire area of the negative electrode active material layer to an area of facing portions of the positive electrode active material layer and the negative electrode active material layer of 100.5% to 104.0%,
a gap between the positive electrode and the negative electrode of 0.1 mm to 0.5 mm, and
a discharge capacity per unit weight of a positive electrode active material in the positive electrode active material layer of 169.0 mAh/g to 178.0 mAh/g.

2. The lithium ion secondary battery according to claim 1, wherein the area ratio is 100.5% to 103.5%.

3. The lithium ion secondary battery according to claim 1, wherein the area ratio is 100.5% to 103.0%.

4. The lithium ion secondary battery according to claim 1, wherein the area ratio is 100.5% to 102.0%.

5. The lithium ion secondary battery according to claim 1, wherein the discharge capacity is 169.0 mAh/g to 175.0 mAh/g.

6. The lithium ion secondary battery according to claim 1, wherein the discharge capacity is 169.0 mAh/g to 172.5 mAh/g.

7. The lithium ion secondary battery according to claim 1, wherein the positive electrode active material includes a lithium transition metal composite oxide.

8. The lithium ion secondary battery according to claim 1, wherein the positive electrode active material contains a lithium cobaltate compound as a main component thereof.

9. The lithium ion secondary battery according to claim 1, wherein the negative electrode active material in the negative electrode active material layer contains a carbon material.

10. The lithium ion secondary battery according to claim 1, wherein the negative electrode active material in the negative electrode active material layer contains graphite as a main component thereof.

11. The lithium ion secondary battery according to claim 1, wherein the positive electrode active material layer has a basis weight of 10 $mg/cm^2$ to 30 $mg/cm^2$.

12. The lithium ion secondary battery according to claim 1, wherein the positive electrode active material layer has density of 3.5 g/cm$^3$ to 4.5 g/cm$^3$.

13. The lithium ion secondary battery according to claim 1, wherein the negative electrode active material layer has a basis weight of 5 mg/cm$^2$ to 15 mg/cm$^2$.

14. The lithium ion secondary battery according to claim 11, wherein the negative electrode active material layer has a basis weight of 5 mg/cm$^2$ to 15 mg/cm$^2$.

15. The lithium ion secondary battery according to claim 1, wherein the negative electrode active material layer has density of 1.0 g/cm$^3$ to 1.9 g/cm$^3$.

16. The lithium ion secondary battery according to claim 12, wherein the negative electrode active material layer has density of 1.0 g/cm$^3$ to 1.9 g/cm$^3$.

17. The lithium ion secondary battery according to claim 1, further comprising a liquid, nonaqueous electrolyte.

18. The lithium ion secondary battery according to claim 17, wherein the nonaqueous electrolyte includes a carbonate-based solvent.

19. A mobile device comprising the lithium ion secondary battery according to claim 1.

\* \* \* \* \*